INVENTOR.
Fred W. Loy
BY
D. C. Staley
HIS ATTORNEY

Nov. 3, 1959 F. W. LOY 2,910,767
METHOD OF ASSEMBLING LAMINATED STATORS
Filed Aug. 16, 1956 3 Sheets-Sheet 2
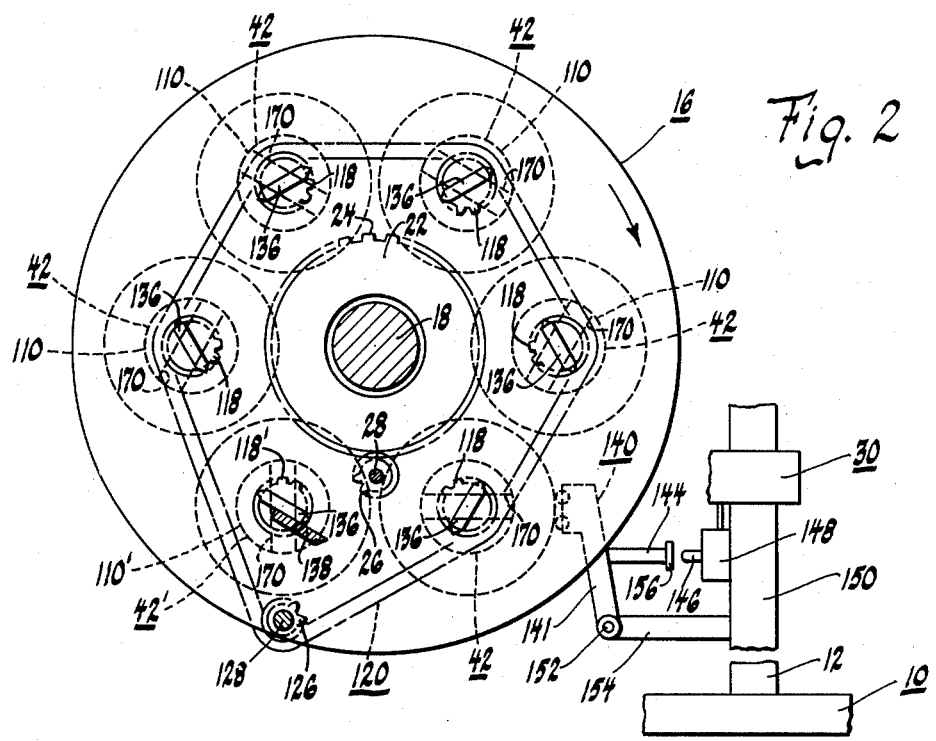
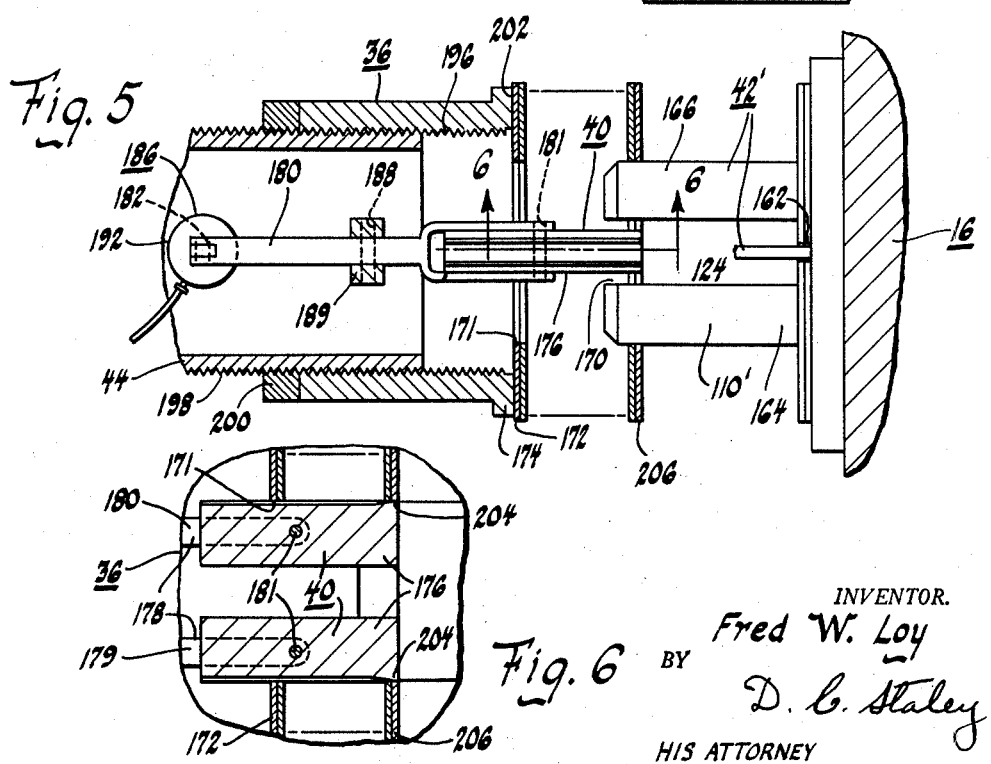
INVENTOR.
Fred W. Loy
BY D. C. Staley
HIS ATTORNEY

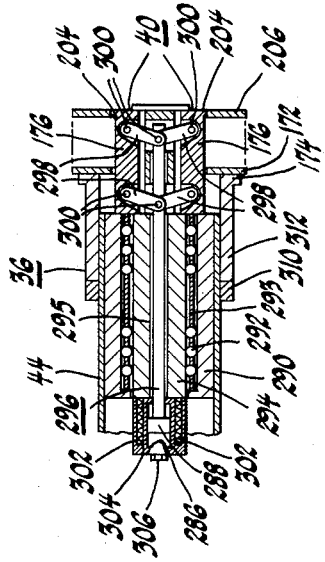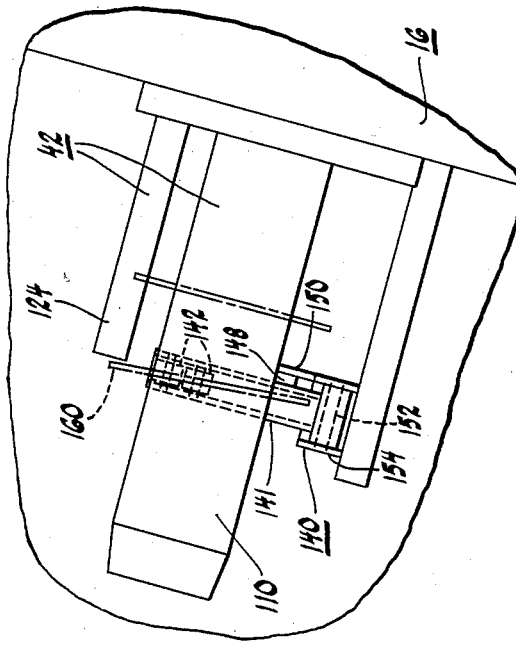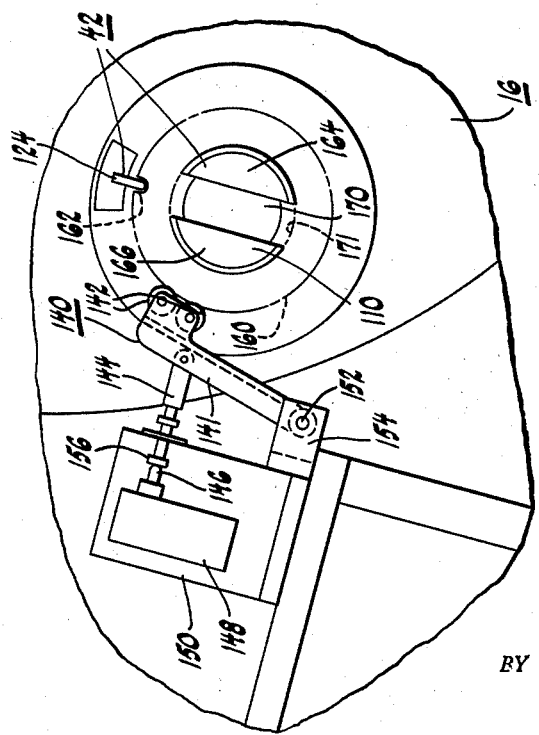

United States Patent Office 2,910,767
Patented Nov. 3, 1959

2,910,767

METHOD OF ASSEMBLING LAMINATED STATORS

Fred W. Loy, Miamisburg, Ohio, assignor to General Motors Corporation, Detroit, Mich., a corporation of Delaware Application August 16, 1956, Serial No. 604,465

6 Claims. (Cl. 29—155.61)

This invention relates to stator lamination assemblies, and particularly to a machine and method for assembling the laminations of a stator for electric motors, generators, or similar apparatus.

In the design and construction of electrical apparatus, the dimensions allotted to a stator and rotor assembly of an electric motor, for example, are of major importance. Providing a stator lamination assembly for mass production installation requires a minimum variation in the overall dimensions of the stator lamination assembly so that proper fitting in the electric motor is quickly achieved in accordance with design and construction requirements.

Heretofore it has been common practice to determine the weight of a correct number of laminations required to provide a stator lamination assembly for an electric motor in accordance with the design and construction dimensional features desired. This weight was used as a master weight to select a comparable weight of stator laminations, duplicating, if possible, the desired stator lamination assembly dimensions for each mass-produced electric motor. However, due to irregularity in the weight and/or dimensions of individual stator laminations, the use of a master weight to determine the correct number of laminations often results in wide variation of the actual overall dimensions achieved when weight-selected stator laminations are pre-assembled for installation in a mass-produced electric motor. Thus, when the stator laminations are joined as by welding under a compressive force to group the multiple laminations, the resulting depth or width dimension of stacked laminations deviates from the design depth dimension to an extent requiring a time consuming and costly custom fitting of the stator lamination assembly with each individual electric motor. The deviation from the design depth dimension often amounts to the equivalent of the thickness of as many as four stator laminations.

Therefore, if it is an object of the present invention to select a plurality of laminations for a lamination assembly in a stack having predetermined design and structural dimension accurate for each group of laminations to within a single lamination thickness when actual assembly is made for installation in electrical apparatus.

Another object is to select grouped laminations rotatably aligned individually with respect to each other and compressible under forces equivalent to those applied in forming a lamination assembly having overall predetermined design and construction dimensions accurate to within one lamination thickness for standardized installation and fitting in electrical apparatus on a mass production basis.

Another object is to provide apparatus for selecting accurately a lamination assembly by a gripping movement operable to engage and remove laminations to a predetermined depth dimension while applying to a stack of laminations a compressive force equal in value to the pressure applied at the time of finally joining the laminations together for insertion in electrical apparatus.

Another object is to provide a method for assembling laminated assemblies having overall depth dimensions accurate to within the width dimension of a single lamination so that any individual lamination assembly can be quickly and easily installed in a mass-produced electrical apparatus including the method steps of aligning the individual laminations relative to each other, compressing the aligned laminations in a stack under forces duplicating the pressures and forces applied in pre-assembling each lamination assembly, measuring the desired depth dimension of the stacked laminations accurately to within the width of one lamination by internally moving an engaging mechanism through the laminations from the face of the lamination at the top of the stack to the last lamination providing the desired depth dimension in the stack, during continued application of the assembly forces, operating the engaging mechanism to engage the last lamination relative to the top of the stack providing the desired dimensional depth under the pressure conditions, relieving the pressure of the compressive force to be duplicated in assembly of the selected aligned laminations, and removing only the laminations from the stack necessary to provide the desired overall lamination depth dimension.

Another object is to provide a method for assembling a laminated stator for electrical apparatus by pre-selecting a required number of individual laminations for a design depth dimension in steps including lining up of the laminations relative to each other on an aligning arbor, compressing the aligned laminations under a force equalling the pressure used at the time of joining the laminations together in a preassembly for installation in a mass-produced electrical apparatus, measuring a predetermined thickness of laminations from the face of the first lamination engaged in compressing the laminations into an aligned stack, and removing only the laminations required to duplicate under equivalent force conditions the desired design thickness dimension accurate to within the thickness of one lamination for a pre-assembled lamination assembly to be installed and fitted quickly in an electrical device on a mass production assembly line.

Another object is to provide a method of preselecting a determined thickness of laminations required to pre-assemble a stator lamination assembly for an electric motor or generator comprising the steps of loosely stacking individual laminations in an aligned relationship relative to each other, compressing the stacked laminations under a force equivalent to the force applied to the laminations in forming a stator assembly, and selecting and removing accurately a number of laminations from the stacked laminations representing a predetermined depth dimension required for each stator lamination assembly upon assembly line mass production installation in an electric motor or generator under duplicated aligning of the laminations relative to each other at an equivalent compressive force used to pre-assemble each stator lamination assembly.

Further objects and advantages of the present invention will be apparent from the following description, reference being had to the accompanying drawings, wherein a preferred embodiment of the present invention is clearly shown.

In the drawings:

Figure 2 is a fragmentary partially sectioned view taken along line 2—2 of Figure 1.

Figure 3 is a fragmentary view of a portion of the apparatus shown in Figures 1 and 2.

Figure 4 is a fragmentary side view of the portion of the apparatus shown in Figure 3.

Figure 5 is a fragmentary view partially in section of a portion of the mechanism in Figure 1.

Figure 6 is a fragmentary sectional view taken along line 6—6 of Figure 5.

Figure 7 is a variation of a portion of the mechanism in Figure 1.

Figure 1:
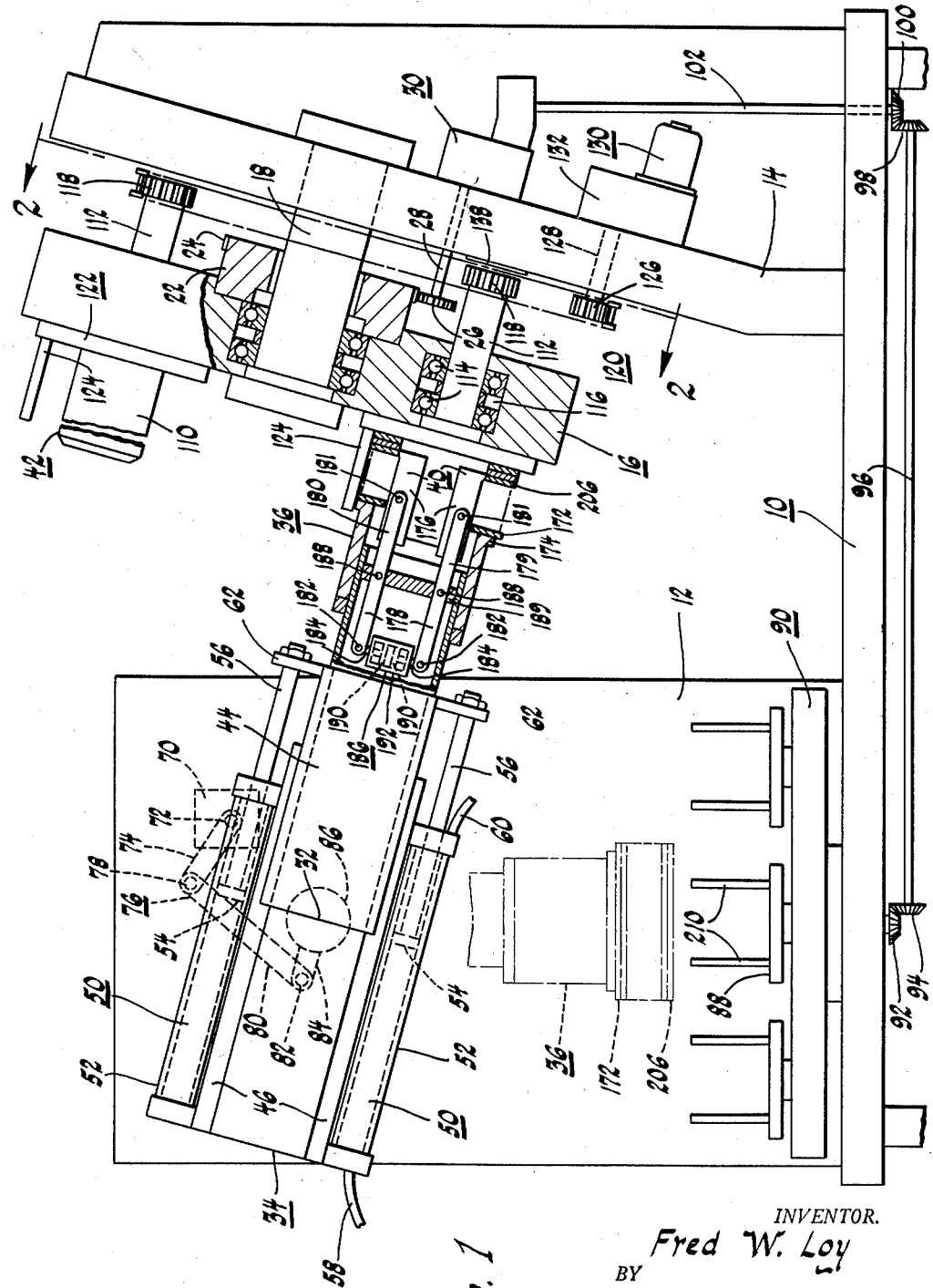
Figure 1 is a side elevational view partially in section of apparatus for carrying out the present invention.

In Figure 1 there is illustrated schematically an apparatus for carrying out the present invention. The apparatus includes a base, generally indicated by the numeral 10, having a vertical support portion 12 and an inclined support portion 14 in spaced relationship to each other as indicated in Figures 1 and 2. The inclined support or wall portion 14 provides a journalling support for a turntable, generally indicated by the numeral 16, through a shaft 18 fitted with a central portion of the inclined support 14. The shaft 18 may be secured in any suitable manner to the inclined wall 14 to provide an inclined axis for ball bearings 20 to support the turntable 16 permitting free rotation of the turntable relative to the base. The turntable 16 can be moved or indexed to a plurality of stations or predetermined positions required for selecting stator lamination assemblies having predetermined depth dimensions as made possible by the present invention. To permit this indexing movement, a ring gear means 22 having teeth 24 engageable with a toothed pinion 26 is securely attached to one side of the turntable 16 as shown. The pinion 26 is mounted on a shaft 28 rotatable by an indexing driving mechanism or indexing motor means, generally indicated by the numeral 30, attached to the support portion or base. The indexing motor means 30 is operable to position the turntable 16 in a manner controlled and functioning as described in further detail below.

The vertical wall portion 12 attached to the base 10 in spaced relationship relative to the inclined wall 14 provides a pivotal support about an axis 32 for a stator lamination selecting means generally indicated by the numeral 34. The stator lamination selecting means 34 includes a ram mechanism, generally indicated by the numeral 36, carrying lamination engaging or gripping members, generally indicated by the numeral 40, for operatively engaging stator laminations to be used in an electric motor or generator assembly in conjunction with aligning means, generally indicated by the numeral 42, attached to the turntable 16. The limination selecting means 34 includes a carriage 44 slidably supported by a track means 46. The ram mechanism 36 is attached to the carriage 44. A pressure applying means or fluid actuated cylinder means, generally indicated by the numeral 50, is attached to the lamination selecting means 34 as shown. The pressure applying actuator means 50 include an outer cylindrical housing 52 having a piston 54 reciprocally movable therein together with a rod portion 56 suitably attached to the piston 54 and protruding longitudinally of the track means 46 from the pressure applying means 50. Fluid pressure may be applied through a conduit 58 from a source (not shown) to move the piston 54 to an extended position as shown in Figure 1. Similarly fluid pressure may be applied to the piston 54 through a conduit 60 from the source through a control mechanism or valve (not shown) to retract the piston 54 together with the piston rod portion 56. The source and control valve mechanism determining supply of fluid pressure to either of the conduits 58 and 60 may be of a conventional type operatively associated with the pressure applying means 50. The end of the piston rod 56 opposite the piston 54 is attached to a flange portion 62 of the carriage 44.

It is apparent from the mechanism described above that movement of the piston 54 through application of fluid pressure on opposite sides thereof causes sliding movement of the carriage 44 on track means 46 due to interconnection with the flange portion 62. The effect of this movement in carrying out the present invention becomes apparent below.

The stator lamination selecting means 34 can be pivoted about the axis 32 by a motor means 70 attached to the vertical wall portion 12. The motor means may be fluid actuated or electrically driven as desired and when actuated can cause a rotative movement of a shaft 72 rigidly connected to one arm 74 of an articulated linkage, generally indicated by the numeral 76. The arm 74 is connected at its end opposite the shaft 72 by a pivot 78 to an intermediate arm 80 of the linkage 76 which in turn is movably attached through a pivot 82 to a member 84 carried by the stator lamination selecting means 34 on a shaft 86 arcuately movable about the axis 32. The motor 70 is energizable to rotate its shaft 72 about an arcuate distance carrying the link 74 rigidly attached to the shaft 72 through an angle required to move the stator selecting means 34 from the inclined position shown in Figure 1 to a vertical position indicated by the fragmentary phantom view of the ram mechanism 36. Preferably the angle of the stator selecting means 34 is inclined 15 degrees relative to the horizontal position of the base 10 as shown in Figure 1. Thus it is obvious that the link 74 preferably effects movement of the stator selecting means 34 about the axis 32 through the linkage 76 a total of 90 degrees less 15 degrees, or 75 degrees. The lamination unloading positioning represented by the vertical phantom view of the ram mechanism 36 can also be at an angle other than the vertical position as desired.

Pivoting the stator selecting means 34 about the axis 32 from the inclined position shown in Figure 1 to the phantom position at 90 degrees or normal to the base aligns the carriage 44 and track 46 in an axis coinciding with the axis of an individual member 88 carried by a horizontal rotatably disposed turntable, generally indicated by the numeral 90, on the base 10. A bevel gear 92 attached to the horizontal turntable 90 meshes with a bevel gear 94 on one end of a shaft 96. The other end of the shaft 96 is provided with another bevel gear 98 meshing with a bevel gear 100 carried by a vertically disposed shaft 102 operatively connected with the indexing mechanism generally indicated by the numeral 30. Both shafts 28 and 102, operatively connected with and rotatable by the indexing mechanism 30, thus coordinate the positioning of turntables 16 and 90, respectively.

In accordance with the objects of the present invention, the inclined turntable 16 is provided with the aligning means 42 so that individual stator laminations can be placed by an operator of the machine on individual mandrels or arbors 110. The turntable rotatably supports a plurality of these mandrels on shafts 112 journalled by bearings 114 in apertures 116 of the turntable 16. Each shaft 112 is provided with a sprocket 118 that can be driven by a belt or chain drive generally indicated by the numeral 120.

It is apparent that individual stator laminations placed on each mandrel 110 will have a tendency to slide downwardly along the 15 degree incline of the axis of rotation provided by each shaft 112. The turntable 16 provides a protruding mounting portion, generally indicated by the numeral 122, forming part of the aligning means 42 and including a finger or alignment plate portion 124 attached to the protruding portion 122. The alignment plate portion or finger 124 extends longitudinally of the axis of each shaft 112. Each stator lamination is provided with a radial notch in its outer peripheral edge having width and depth dimensions corresponding to the dimensions of each finger 124 so that the laminations become aligned relative to each other with respect to each notch forming a longitudinally extending recess or groove in alignment with the longitudinally extending finger 124. The force of gravity causing sliding movement of each lamination down the incline together with the rotational effect transmitted from the shaft 112 through the mandrel 110 aligns a plurality of stator laminations into a loosely grouped stack about each mandrel 110 for a purpose and function in cooperation with the stator selecting means 34 to be described in further detail below.

The aligning means 42 are continuously operated to stack individual stator laminations in alignment relative to each other on each of a plurality of mandrels 110 by the belt 120 driven through a drive sprocket 126 carried by a shaft 128 extending through the inclined wall 14 and rotatably driven by a motor means generally indicated by the numeral 130. The motor means 130 can have a gear reduction 132 operatively connected with the shaft 128.

The driving connection for the aligning means 42 can be more clearly understood from the view shown in Figure 2 taken along line 2—2 of Figure 1. Figure 2 shows the drive sprocket 126 driven by the motor means 130 and indicates the driving connection established by the chain means or belt 120 with each sprocket 118 attached to the shaft 112 for rotating each mandrel 110. Figure 2 also shows the ring gear means 22 disposed with teeth 24 engageable with the driving pinion 26 transmitting indexing rotative movement of the shaft 28 from indexing means 30. The shaft 18 provides a support through the bearings 20 mentioned above to permit rotation of the turntable 16 about an inclined axis into a plurality of stations or positions of individual aligning means 42. The belt or chain 120 is continuously driven by the motor means 130 so that all aligning means except one are continuously in operation for aligning the individual stator laminations relative to each other longitudinally along the axis of each shaft 112. Figure 2 clearly shows the turntable 16 indexed to a position where one of the aligning means 42' is disengaged from rotation by the chain 120. This aligning means 42' is in a position longitudinally aligned and coaxial with the stator lamination selecting means 34 in the inclined axis represented by the partially sectioned view of the ram mechanism 36 and turntable 16 of Figure 1. As the turntable is indexed to the position shown in Figure 2, the mandrel 110' of aligning means 42' having the sprocket 118' becomes disengaged from the chain 120 so that a diagonal or transverse block portion 136 attached to the sprocket end of each shaft 112 strikes a stationary block or vertical alignment portion 138 attached to the inclined stationary wall 14. Engagement of the blocks 136 and 138 relative to each other stops rotation of the mandrel 110' included with the aligning means 42'.

It should be noted that the position of the aligning means 42' disengaged from the continuous drive effected through the chain 120 is a relationship with the stator lamination selecting means 34 that preferably can occur only after all of the individual stator laminations placed on each mandrel 110 have been completely aligned relative to each other. This complete aligning operation is assured by an additional mechanism preferably included with the apparatus for carrying out the present invention. The mechanism assuring complete alignment, generally indicated by the numeral 140, includes a linkage 141 having one or more rollers 142 engageable with any stator laminations not yet completely aligned relative to each other. The linkage 141 carries an adjustable arm 144 engageable with a plunger 146 of a limit switch 148 attached to a wall support portion 150 which can be made integral with the base 10, inclined wall 14 or vertical wall 12. The linkage 141 is pivotally attached about a pin 152 at a free end of a cantilever support arm 154 attached to the wall portion 150. The limit switch 148 can control electric power supply or a solenoid for positioning a fluid pressure control valve for a motive source operating the indexing mechanism 30. The specific means for powering the indexing means is immaterial to the present invention. In operation, whenever the rollers 142 engage a stator lamination 160, which is not completely aligned relative to each of the other stator laminations on its particular stack, the adjustable arm 144 has a contact portion 156 engageable with the plunger 146 of the limit switch to interrupt operation of the indexing mechanism 30 until all laminations of the group in the stack preceding the disengaged arbor aligning means 42' is completely aligned. As soon as the linkage 141 is free of engagement with unaligned stator laminations, the indexing mechanism is free to move the turntables 16 and 90 an arcuate distance corresponding to the angle of movement required to move from one station to the next with the mandrels.

The linkage means 141 included with the mechanism assuring complete alignment of all stator laminations is shown in further detail in Figures 3 and 4 where the rollers 142 are shown engaging a stator lamination 160 placed over the mandrel 110. The fragmentary view of Figure 3 shows the alignment plate portion or finger 124 in an end view engageable and cooperable with a radial notch 162 in the outer peripheral edge of the stator lamination 160. The limit switch and pivot points cooperable with the linkage 141 may be disposed with the base or wall portions of the apparatus in the present invention in any suitable manner. The arbor or mandrel 110 as viewed in the end view of Figure 3 includes semi-cylindrical segments 164 and 166 extending longitudinally of the axis of each shaft 112 for the aligning means 42. The outer peripheral surface of these semi-cylindrical segments is engageable with the inner peripheral edge of each stator lamination to effect rotation thereof about the axis of the shaft 112 until the notch 162 becomes aligned with and slides longitudinally along the protruding edge of the finger 124. The sliding movement of the stator lamination 160 under the force of gravity down the inclined axis represented by the shaft 112 aligns each stator lamination relative to the other in its particular stack forming a groove or recess with the finger 124 with multiple notches 162. The lamination 160, as shown in Figures 3 and 4, has just been moved by the rotating mandrel 110 to a position where the notch 162 coincides longitudinally with the aligning edge of finger 124. At this point the lamination is free to slide down the inclined axis of the mandrel 110 into aligned relationship with other laminations already loosely grouped on the stack. When all laminations are radially clear of the alignment assuring mechanism 140, the mandrel 110 can be moved by the indexing mechanism 30 into the station position in alignment with the stator selecting means 34.

It is apparent that the semi-cylindrical portions 164 and 166 of the mandrel 110 as shown in Figure 3 extend longitudinally of the axis of the shaft 112 and form a gap or longitudinally extending slot 170 which extends diagonally or transversely relative to the diameter of an internal opening 171 of each individual stator lamination aligned with respect to the other on the mandrel 110. Generally in the operation of the apparatus in the present invention, the rotation imparted to each mandrel 110 by the continuously driven chain 120 is sufficient to assure alignment of all stator laminations placed on each mandrel within the time it takes for the indexing mechanism 30 to move the turntable 16 through a complete cycle of all available stations or positions. Thus when a loosely stacked group of stator laminations reaches the position immediately preceding the disengagement of sprocket 118 from the chain 120 for alignment of block 136 with the block 138 on the stationary wall, the linkage 141 does not cause interruption of the cycling of the apparatus by actuation of the limit switch 148.

Assuming complete alignment of all stator laminations on the mandrel 110 in this position preceding engagement of blocks 136 and 138, the machine will cycle to move one mandrel into alignment with the lamination selecting means 34 for the next step in the method of selecting stator laminations. The engagement of the block 138 with the transverse member or block 136 causes the gap or transverse slot 170 to be aligned vertically relative to the base or angularly corresponding to the positioning of the gripping or engaging members, generally indicated by the numeral 40, operatively associated with the ramming mechanism 36 of the stator selecting means 34. Preferably, the alignment of this slot 170 with the gripping members 40 is vertical as indicated in Figure 2 and the mandrel which is aligned with the block 138 becomes operatively associated with the stator lamination selecting means 34. The apparatus may be manually controlled or automatically actuated to cause the actuator means 50 to move the carriage 44 along track 46 in a compressing action transmitting force from the ram mechanism 36 to the first or top stator lamination 172 of the aligned stack. The engagement occurs at a compressive force through a flange portion 174 of the ramming mechanism 36 as shown in Figure 1. Due to the vertical pre-alignment of the gap or slot 170 between the semi-cylindrical segments 164 and 166 of the mandrel 110, the gripping members 40 move axially and longitudinally within the open portion between the segments and stacked stator laminations. At the time the ramming mechanism 36 engages the stator laminations the gripping members 40 are not actuated and are in a retracted positioning such that they move freely through the gap 170 without striking or engaging either the mandrel segments or stator laminations. The force applied to the stacked laminations through the pressure applying means 50 is continuously applied to diametrically opposite sides of the carriage 44 through the flanges 62 so that the flange portion 174 of the ramming mechanism compresses the stator laminations evenly about the arcuate configuration of each stator lamination. The force applied by the pressure applying means duplicates the compressive force and assembly stresses and strains applied to a stator lamination assembly when forming a preassembled stator lamination assembly for an electric motor or generator. Thus the ramming mechanism 36 of Figure 1 overcomes the physical irregularities and inherent resiliency and springing action of the grouped stator laminations to form a stack of laminations aligned and compressed under the same conditions used to preassemble the stator lamination assembly having desired predetermined design and dimensional characteristics. The application of the pressure through the pressure applying means 50 continues through the next portion in the cycle of operation of the apparatus in accordance with the present invention.

The stator lamination selecting means 34 at the present stage of operation has compressed a plurality of stator laminations into a stack including more than the number of stator laminations which are required to provide the desired depth or width dimension for the design stator lamination assembly. At this point the gripping members are actuated to measure the distance and engage the proper depth of stator laminations to provide the desired stator lamination assembly dimensions.

The gripping members generally indicated by the numeral 40 include the following parts shown in Figure 1. A pair of fingers 176 are pivotally attached to a scissors linkage 178 including links or fork members 179 and 180 by means of pins 181 projected through the fingers 176 and openings at one end of each link. At their other end the links are pivotally attached by pins 182 to a pair of rods 184 extending outwardly from opposite sides of a fluid motor, generally indicated by the numeral 186. A central portion of each link is pivoted by pins 188 relative to a transverse cross member 189 suitably attached extending through the hollow interior of the carriage 44. The motor 186 can be provided with a pair of pistons 190 movably disposed within a cylindrical body portion 192. It is obvious that if fluid pressure from a suitable source (not shown), such as hydraulic fluid or compressed air is applied to separate the pistons 190 from each other within the cylindrical body portion 192, a scissors-like movement occurs through the linkage 178 about the pivots 188 causing the fingers 176 to be moved relatively closer to each other so as to be free of engagement with the inner peripheral edges of the stacked stator laminations. Similarly, it is obvious that the pistons 190 could be actuated so as to be moved relatively closer with respect to each other causing a scissors-like movement separating the fingers 176 from each other, and causing them to engage a portion of the stacked stator laminations. The specific structure of the linkage 178 and the motor means for actuating this linkage to effect engaging movement of the fingers 176 as gripping members, generally indicated by the numeral 40, may be varied to include any arcuated linkage serving the function of permitting longitudinal movement of the gripping members during the compressing movement of the ram mechanism 36 followed by the expanding movement of the gripping members generally indicated by the numeral 40 to engage a portion of the compressed group of laminations.

The fragmentary view of Figure 5 shows a portion of the ram mechanism 36 together with the gripping members 40 as viewed from the top of the mandrel 110' of Figure 2 looking down through the gap or slot 170 formed between semicylindrical segments 164 and 166. The view in Figure 5 shows the apparatus progressing from the ramming step of Figure 1 through the next steps in the cycle of operation of the present invention. The functions brought about by the apparatus can be more clearly seen in Figure 6 which is a fragmentary sectional view along line 6—6 of Figure 5 of the gripping members 40 described above.

It is apparent that with the operation of the fluid motor 186 effecting scissors-like movement of the linkage 178 to cause engagement of fingers 176 with a portion of the laminations dependent upon the positioning of the flange portion 174 of the ram mechanism 36, a predetermined width or depth dimension is measured from the face of the first lamination 172 engaged during the compressing of the individual laminations into a stack. The flange portion 174 of the ram mechanism 36 is carried by an internally threaded cylindrical portion 196. The threads of this cylindrical portion 196 are adjustably movable over an externally threaded portion 198 formed at one end of the carriage 44. A lock ring 200 is internally threaded to be movably engageable against one end of the cylindrical portion 196 of the ram mechanism to provide a fine adjustment of the exact positioning of the end surface 202 on the flange portion 174 engageable with the face of the stator lamination 172 at the top of the lamination stack. The precise adjustment of the lock ring 200 with the cylindrical portion 196 on the outer threaded portion 198 determines the exact depth dimension relative to a wedge-shaped end portion 204 formed at the end of the fingers 176 farthest removed from the articulated linkage 178. The positioning of the surface 202 is preset relative to the threaded portion of the carriage to provide the proper width dimension with respect to the outermost pointed edge of the wedge portions 204 of the fingers 176.

It is apparent that the wedge portions 204 of the fingers 176 positively engage diametrically opposite portions of the inner peripheral edge of one stator lamination 206 representing the final lamination required with respect to the top lamination 172 for forming a lamination assembly having the desired width or depth dimension for a specific installation design of an electrical device. The wedged portions 204 of each of the fingers 176 must positively engage diametrically opposite edge portions of the same stator lamination, such as the lamination 206, to engage the group of laminations representing the desired width dimensions for removal from the rest of the stacked laminations on the mandrel. It is obvious that if the wedge portion of only one finger engages one lamination, that partially engaged lamination is not firmly engaged by both fingers 176 and can slip or spring free of the stack of laminations included within the desired depth dimension to be selected and removed by the apparatus of this invention. The wedge portions of the fingers then engage the next lamination at diametrically opposite inner edge portions thus providing a lamination dimension selecting accuracy to within one stator lamination thickness.

With proper engagement of the wedge portions 204 on fingers 176 with the last stator lamination 206 after measuring of the desired depth dimension using the combined effects of force application through the ram mechanism 36 and outward wedging operation of the gripping members 40, the stator lamination selecting means is ready for the next step in the cycle of operation of the apparatus performing the method of stator lamination selection in the present invention.

In this step following the measuring of the depth dimension and wedging engagement of the last stator lamination, the pressure applying means 50 are subjected to a retracting force conveyed through the carriage 44 movable on the track 46 causing removal of the stator laminations between the flange portion 174 and wedge portions 204 from the mandrel 110. This retract movement is necessary to clear the inner opening or apertures 171 of the selected stator laminations from engagement with the semi-cylindrical segments 164 and 166 of the mandrel 110. It is obvious that the selected laminations cannot be pivoted by the selecting means 34 about the axis 32 until the last lamination 206 is completely clear of possible striking engagement with the protruding ends of the semi-cylindrical segments 164 and 166. After the selected stator laminations have been removed from the mandrel and pivoted to an unloading position indicated by the phantom lines in Figure 1 vertically above the horizontally disposed member 88, the fluid motor 186 is actuated to cause the linkage 178 to effect a retracting movement of the wedge portions 204 away from the diametrically opposite inner peripheral edges of the last stator lamination 206. With this retracting movement, a scissors-like action occurs causing the fingers 176 to move to a position free of engagement with the inner edges of the stator laminations. Preferably, the selected laminations are moved downwardly a fractional distance by the pressure applying means 50 to assure positive alignment with individual winding slots of each lamination on vertically protruding posts 210 mounted on the member 88. Then as the fingers 176 are retracted from wedging engagement with the selected laminations, the force of gravity causes the selected laminations to be deposited on the member 88.

The pivotal action about the axis 32 effected by the motor means 70 and linkage 76 is now reversed to return the selecting means 34 to its inclined position as shown in Figure 1. The indexing means 30 operatively associated with the turntables 16 and 90 effects movement of each turntable through an arcuate distance moving the next successive mandrel 110 and member 88 into position for another lamination selecting cycle of the selecting means 34.

As the indexing means 30 moves the mandrel 110' from the stator selecting position just described above, the sprocket 118' with its transverse member 136 becomes disengaged from the stationary aligning block 138 on the inclined wall portion 14 and returns into engagement with the chain 120 to resume rotation of the mandrel 110. Stator laminations are then placed on the mandrel again by an operator of the machine and the aligning of each stator lamination relative to the other is repeated by the aligning step described above until the mandrels have been completely rotated about the 360 degree movement of the turntable 16 for a repeated application of compressive force and selective engagement of a predetermined number of laminations providing the desired depth dimensions. It is obvious that if laminations are continuously placed upon mandrels and aligned by the finger 124 extending longitudinally with the mandrels 110, a loosely grouped stack of laminations comprising more than the number of laminations required to provide the desired thickness of the lamination assembly will be available for engagement by the selecting means 34 which repeats its cycle of operation for each station of movement effected by the indexing means 30. A plurality of members 88 can be provided on the horizontal turntable 90 so that an operator can remove the preselected number of stator laminations to another machine effecting the assembly of the stator laminations aligned relative to each other under duplicate pressure conditions. The method and apparatus of the present invention provides a lamination assembly having a width dimension accurate to within one lamination thickness which may be welded together longitudinally relative to each other as a completed preassembly for insertion in an electric motor or generator. This represents a minimum of variation in the width dimension necessary for the electrical design desired under duplicated lamination assembly force conditions.

It is to be noted that the mechanism with gripping members 40 shown in Figure 1 may be modified as shown in the fragmentary view of Figure 7 for actuation by a fluid motor 286 mounted relative to the carriage 44 in a manner providing floating support for the laminations selected from the stack as described above. An outer support or bearing member 290 is suitably attached to the inner periphery of the carriage 44. A press fit, threaded engagement, or keyway could be used to secure the outer member 290 to the carriage 44. A plurality of bearing elements, or balls, 292 retained by a cage 293 are rotatably disposed between the outer member 290 and an inner sleeve or support member 294 having a longitudinally-extending hollow mid-portion or axial opening 295. An actuating rod 296 passes from piston 288 of motor 286 through opening 295 to affect pivotal movement of a plurality of links 298 causing fingers 176 to be moved radially into and out of engagement with laminations depending upon actuation of piston 288 in motor 286. Pivot pins 300 provide an articulated connection between fingers 176, links 298 and rod 296 capable of causing a radially outward spreading movement of fingers 176 like that resulting from the scissors action outlined with the Figure 1 embodiment. Resilient means or springs 302 disposed in recesses or sockets 304 of the motor 286 provide a floating or flexible mounting of the actuating mechanism for fingers 176 relative to the sleeve 294. Mounting bolts 306 (a broken away portion of which is shown in Figure 7) can be disposed through openings in the motor 286, parallel to recesses 304 for the springs except that the bolt openings extend completely through the opposite ends of the motor. A bolt head or other retaining means can then limit floating movement of the motor 286 by springs 302 in an axial direction relative to the rod 296 with the balls 292 permitting radial rotation for complete floating action of the mechanism with fingers 176 compensating any lamination fluffing action transmitted between the flange portion 174 of ram mechanism 36 and wedged portions 204 of each finger 176. The tension of springs 302 retains the specific number of laminations selected between the gripping members without loss of one or more laminations due to springiness of the selected laminations themselves as they are removed from the stack. A lock ring 310 may be fitted or threaded over the outer periphery of the carriage 44 into engagement with an annular portion 312 of the ram mechanism 36 to permit adjustment thereof with carriage 44 determining relative positioning between wedge portions 204 of fingers 176 and flange portion 174 of the ram mechanism.

The floating support described above assures that selected laminations will not be lost over wedge portions of the fingers when the carriage 44 is retracted as described. The springs compensate for fluffing apart of laminations removed from the stack and permit limited axial movement of the selected laminations away from the flange portion 174 with continued positive gripping action by the fingers.

While the embodiment of the present invention as herein disclosed constitutes a preferred form, it is to be understood that other forms might be adopted.

What is claimed is as follows:

1. A method for selecting laminations to pre-assemble a stator lamination core assembly having a predetermined depth dimension, including, the steps comprising, aligning the laminations relative to each other, compressing the laminations into a stack under a force equal to that applied in forming a stator core assembly, internally measuring an unmarked predetermined lamination thickness from one face of the stacked laminations to a desired design depth dimension for the stator core assembly, mechanically engaging the last lamination internally and individually at the predetermined thickness dimensional distance from the face of the stacked laminations, relieving the compressing force from the stacked laminations, and removing only the selected number of laminations from the stack for pre-assembly as the lamination assembly.

2. A method for selecting a number of laminations for a dynamoelectric machine stator assembly having a depth dimension accurate to within the width of a single lamination, the steps comprising, aligning the laminations relative to each other, ramming and stacking the laminations under a compressive force equalling the force applied in stacking the aligned laminations at the time of welding the laminations together as a pre-assembled stator lamination assembly, individually and mechanically engaging one lamination in the stack relative to an unmarked predetermined depth dimension measured from the face of the first lamination at one side of the stack, relieving the compressive force applied in stacking the laminations, and mechanically removing only the laminations representing the predetermined thickness under the compressive force.

3. The steps in a method of assembling dynamoelectric machine laminations for a pre-assembled stator core lamination assembly, comprising, rotating individual laminations on a mandrel, aligning and stacking the laminations relative to each other on the mandrel by a sliding movement down an inclined angle at which the mandrel is rotatably mounted so that a notch provided in the outer peripheral edge of each lamination engages a finger longitudinally spaced relative to the mandrel, ramming and compressing the aligned stack of laminations with a ram pressure force equal to the force used at the time of joining the laminations together into a pre-assembled stator lamination assembly, measuring off a predetermined depth dimension from the face of one lamination at one side of the stack of laminations to a lamination within the stack by means of an articulated gripping linkage internally engageable with the inner peripheral edge of the lamination, gripping the lamination located at the measured depth during continued application of compressive force to the lamination stack with a pair of fingers carried by the articulated linkage, wedging the last lamination away from the remaining laminations in the stack while simultaneously relieving the pressure applied to the stack so that the individual laminations included within the selected depth dimension are loosely shifted over the mandrel, and removing only the preselected laminations for the stator assembly from the mandrel for welding in aligned relationship to each other under compressive force duplicating the force conditions of selecting the laminations having the predetermined depth dimension.

4. The method of claim 3 in which prior to compressing the aligned stack of laminations there is a checking of laminations to assure complete alignment thereof relative to each other before measuring off and selecting a predetermined depth dimension from the stack of laminations under the ram pressure force.

5. A method for assembling dynamoelectric machine laminations of springy sheet metal for a stator lamination core, the steps comprising; providing at least one mandrel adapted to be indexed both relative to a station wherein springy sheet metal laminations are loosely placed on the mandrel and relative to a further station wherein the springy sheet metal laminations are aligned relative to each other, aligning the laminations in a stack relative to each other in the first-mentioned station, ramming and compressing the aligned laminations under a force applied in the further station and equalling the pressure used at the time of joining the laminations as a sheet metal lamination stator core, assuring alignment of the laminations relative to each other in the first-mentioned station prior to indexing of the mandrel and aligned laminations into the further station for ramming and compressing the aligned laminations, selecting and mechanically removing from one stack only laminations having an unmarked predetermined depth dimension set from the face of a first lamination engaged during ramming and compressing in the further station.

6. The steps in a method of assembling dynamoelectric machine laminations of springy sheet metal for a stator core, comprising, providing a plurality of mandrels each adapted to be indexed relative to more than one station in which mandrels can be rotated and one station in which rotation is stopped, rotating the mandrels so that laminations of springy sheet metal loosely placed on the mandrels are aligned relative to each other, assuring alignment of the laminations relative to each other in a station prior to said one station in which rotation is stopped, indexing a mandrel on which laminations are aligned relative to each other into one station in which rotation is stopped, ramming and compressing all laminations on the mandrel in the one station in which rotation is stopped, instantaneously selecting an unmarked predetermined thickness of laminations during said ramming and compressing, and removing the predetermined thickness of laminations.

References Cited in the file of this patent

UNITED STATES PATENTS

| | | |
|---|---|---|
| 1,822,441 | Knuuti | Sept. 8, 1931 |
| 2,302,758 | Garbe | Nov. 24, 1942 |
| 2,304,607 | Sleeter | Dec. 8, 1942 |
| 2,548,628 | Somerville | Apr. 10, 1951 |
| 2,658,268 | Knauf et al. | Nov. 10, 1953 |
| 2,671,951 | Sliwiak | Mar. 16, 1954 |
| 2,750,659 | Sassi | June 19, 1956 |
| 2,792,766 | Dubuc | May 21, 1957 |